United States Patent
Geisen et al.

(10) Patent No.: US 9,919,694 B1
(45) Date of Patent: Mar. 20, 2018

(54) CONTROL SYSTEM FOR A COMPLEX MECHANICAL SYSTEM

(71) Applicant: Ball Aerospace & Technologies Corp., Boulder, CO (US)

(72) Inventors: Glen R. Geisen, Waynesville, OH (US); Scott S. Grigsby, Springboro, OH (US); Joe L. Gribble, Bellbrook, OH (US); Robert Mastronicola, Beavercreek, OH (US); Benjamin D. Ausdenmoore, Beavercreek, OH (US)

(73) Assignee: BALL AEROSPACE & TECHNOLOGIES CORP., Boulder, CO (US)

( * ) Notice: Subject to any disclaimer, the term of this patent is extended or adjusted under 35 U.S.C. 154(b) by 107 days.

(21) Appl. No.: 14/698,474

(22) Filed: Apr. 28, 2015

Related U.S. Application Data

(60) Provisional application No. 61/985,311, filed on Apr. 28, 2014.

(51) Int. Cl.

| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |

(Continued)

(52) U.S. Cl.
CPC ............ *B60W 10/00* (2013.01); *B60W 10/18* (2013.01); *B60W 10/20* (2013.01); *B60W 2510/18* (2013.01); *B60W 2510/20* (2013.01); *B60W 2710/18* (2013.01); *B60W 2710/20* (2013.01); *B60W 2720/10* (2013.01)

(58) Field of Classification Search
CPC ...... B60W 10/00; B60W 10/18; B60W 10/20; B60W 2510/18; B60W 2510/20; B60W 2710/18; B60W 2710/20; B60W 2720/10; B60W 2710/26; B60W 2710/28
See application file for complete search history.

(56) References Cited

U.S. PATENT DOCUMENTS

| | | |
|---|---|---|
| 4,207,959 A | 6/1980 | Youdin et al. |
| 5,812,978 A | 9/1998 | Nolan |

(Continued)

FOREIGN PATENT DOCUMENTS

WO    WO 2011/005080    1/2011

*Primary Examiner* — Rachid Bendidi
(74) *Attorney, Agent, or Firm* — Sheridan Ross P.C.

(57) ABSTRACT

Control systems and methods for facilitating human control of complex systems, including complex mechanical systems, are provided. The control system can include one or more user input devices adapted to receive user inputs in various forms. Electronic signals generated by the user input devices in response to the user inputs are provided to a controller, which processes the signals, validates and prioritizes those signals, and generates appropriate control signals. The control signals are then provided to the controlled system. User feedback regarding the operation of the control system, the controlled system, an operating environment, or the like, can be delivered to the user through the control system.

15 Claims, 8 Drawing Sheets

(51) Int. Cl.
  *G06F 19/00*   (2011.01)
  *B60W 10/00*   (2006.01)
  *B60W 10/18*   (2012.01)
  *B60W 10/20*   (2006.01)

(56) References Cited

U.S. PATENT DOCUMENTS

| | | | | |
|---|---|---|---|---|
| 6,880,855 | B2* | 4/2005 | Chernoff | B60N 2/4693 |
| | | | | 180/315 |
| 6,898,496 | B2* | 5/2005 | Chernoff | B60K 26/02 |
| | | | | 180/315 |
| 6,948,740 | B2* | 9/2005 | Chernoff | B60N 2/4693 |
| | | | | 280/775 |
| 7,783,391 | B2 | 8/2010 | Jeong et al. | |
| 2004/0006479 | A1 | 1/2004 | Tanaka | |
| 2004/0267442 | A1 | 12/2004 | Fehr et al. | |
| 2006/0011805 | A1* | 1/2006 | Spruck | G02B 27/017 |
| | | | | 250/206.1 |
| 2007/0100508 | A1* | 5/2007 | Jeong | A61B 5/04888 |
| | | | | 701/1 |
| 2010/0211264 | A1* | 8/2010 | Wey | B62D 6/00 |
| | | | | 701/41 |
| 2011/0295468 | A1* | 12/2011 | Crombez | B60T 7/042 |
| | | | | 701/48 |
| 2014/0180568 | A1* | 6/2014 | Nagata | B60T 7/22 |
| | | | | 701/301 |
| 2014/0297120 | A1* | 10/2014 | Cotgrove | B60T 8/17552 |
| | | | | 701/41 |
| 2015/0109756 | A1* | 4/2015 | Choi | B60K 37/02 |
| | | | | 362/23.01 |

* cited by examiner

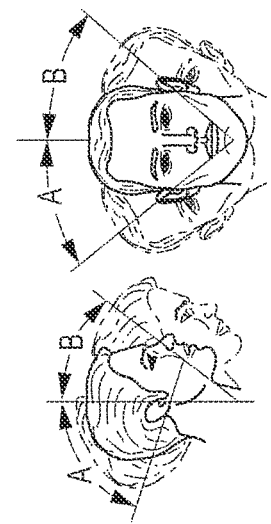
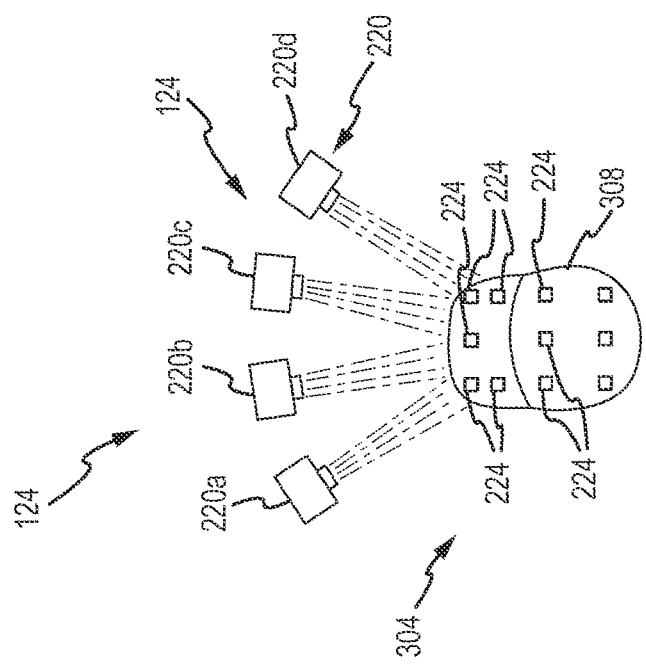
FIG.3A  FIG.3B  FIG.3C

CONTROL SYSTEM FOR A COMPLEX MECHANICAL SYSTEM

CROSS-REFERENCE TO RELATED APPLICATIONS

This application claims the benefit of U.S. Provisional Patent Application Ser. No. 61/985,311, filed Apr. 28, 2014, the entire disclosure of which is hereby incorporated herein by reference in its entirety.

FIELD

The present disclosure relates to the control of complex systems. More specifically, systems and methods that facilitate human control of complex mechanical systems are provided.

BACKGROUND

Traditional control of complex mechanical or other controlled systems has been through the use of direct mechanical connections between a control input and the controlled system component. For example, steering wheels mechanically connected to the wheels of a car have been used for controlling the steering of the car. As a further example, pedals have been used for controlling car speed and braking. As still further examples, joysticks have been used for controlling aircraft ailerons and elevators, and levers have been used for controlling aircraft engine power, etc. These traditional control mechanisms are effective, but require the operator to have relatively full physical capabilities. In addition, the need to provide room for such inputs and their associated connections limit cockpit design options.

More recently, "fly by wire" type systems have been developed. Such systems replace mechanical connections between the input and the control mechanism with electronic communication channels. Such systems can provide increased flexibility in the packaging of the control systems. In addition, such systems can facilitate the application of filters and other overlays on control inputs provided by a user, and can also facilitate the integration of such systems with "autopilot" systems. However, mechanical input devices, which require sufficient space to accommodate their range of motion, and access by the human operator, continue to be required.

In addition to packaging limitations, traditional control inputs have been difficult or impossible for individuals with physical limitations to use. For example, quadriplegics and paraplegics are unable to control conventional vehicles using standard control inputs. Although modifications to vehicle control systems can be made, for example, "hand controls" can be used in place of foot operated pedals in a motor vehicle to enable paraplegics to drive, such systems are typically cumbersome, and require good motor control on the part of the operator. For quadriplegics, joysticks, "sip and puff", and tongue controlled input devices are available. Although such devices are promising, additional options would be desirable. In addition, for critical activities, such as driving an automobile or flying an airplane, accurate interpretation of control inputs, and distinctions between different inputs, are critical.

SUMMARY

In accordance with embodiments of the present disclosure, a control system for facilitating human control of a complex system is provided. The control system includes one or more user input devices, operable to receive user input signals. The user input signals are transformed into electronic signals that are filtered, prioritized, or otherwise processed by a controller included in the control system. For user inputs determined to be valid and/or otherwise appropriate for delivering to the controlled system, the controller produces a corresponding control input. The control input is delivered to and acted upon by the controlled system. A feedback device, or devices, can be included to provide the user with information regarding the receipt and interpretation of user signals, the current state of the controlled system, or the like. At least some embodiments are directed to providing human control of a system by persons with less than full physical capabilities. For example, user inputs can be provided that receive control signals in the form of movement of a user's head or other extremity. Another example of a user input is a bite pressure sensor. Still other example of a user input is a voice control input.

Methods in accordance with embodiments of the present disclosure include validating and/or prioritizing user input signals. In addition, user input signals are filtered, smoothed, or otherwise processed before being provided to the controlled system. The methods can include providing the user with feedback regarding the application of user input signals to the controlled system, and the state of the controlled system.

Additional features and advantages of embodiments of the present disclosure will become more readily apparent from the following discussion, particularly when taken together with the accompanying drawings.

BRIEF DESCRIPTION OF THE DRAWINGS

FIG. 3A depicts an example user input in accordance with embodiments of the present disclosure;

FIG. 3B depicts a range of motion monitored by the user input of FIG. 3A as a user input signal in accordance with embodiments of the present disclosure;

FIG. 3C depicts another range of motion monitored by the user input of FIG. 3A as a user input signal in accordance with embodiments of the present disclosure;

DETAILED DESCRIPTION

Figure 1:
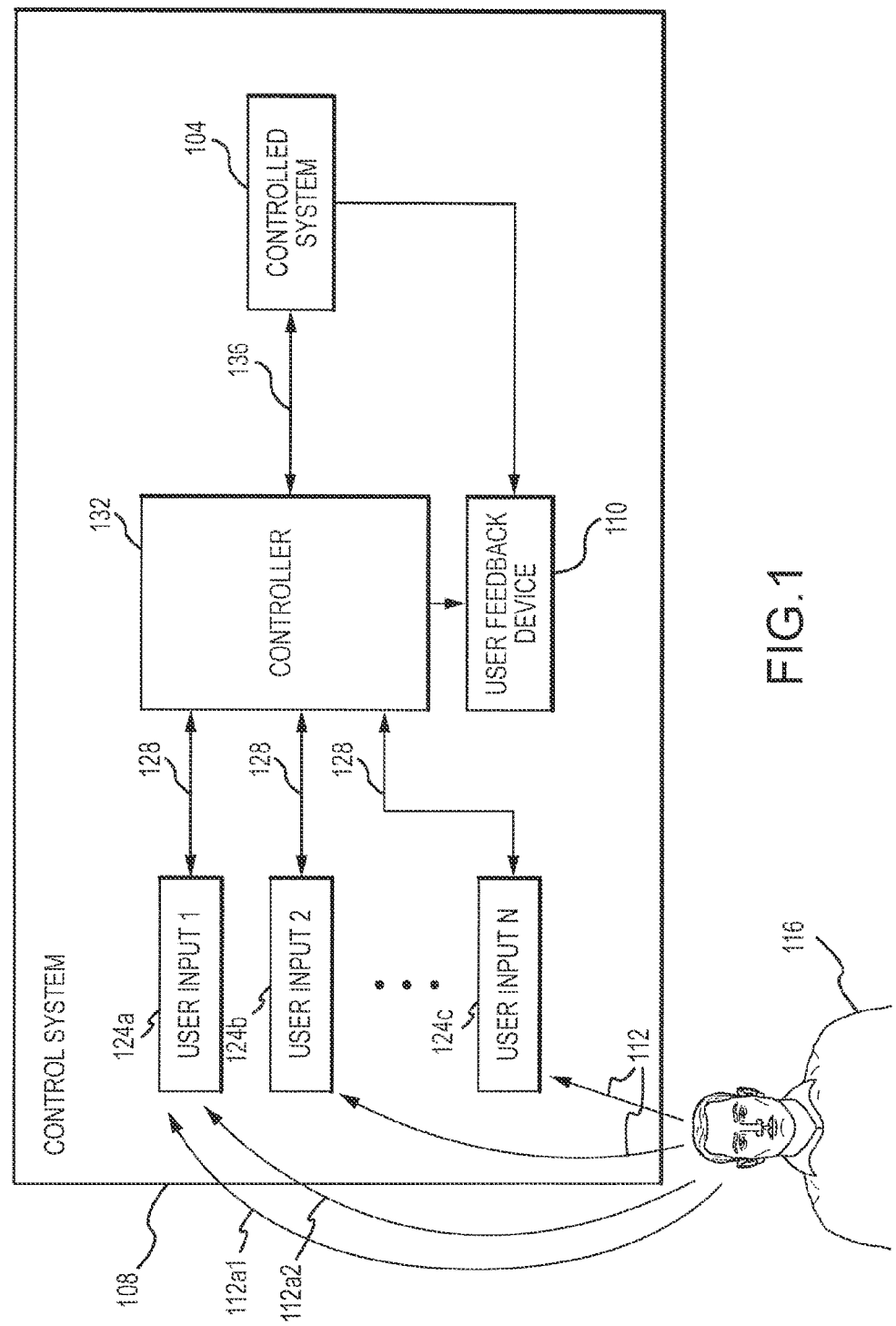
FIG. 1 is a block diagram depicting a controlled system and an associated control system in accordance with embodiments of the present disclosure.

FIG. 1 is a block diagram depicting a controlled system 104 that receives control inputs and provides feedback to an associated control system 108 in accordance with embodiments of the present disclosure. Examples of a controlled system 104 include, but are not limited to complex mechanical systems, such as automobiles, wheelchairs, airplanes, or other vehicles. Other examples of a controlled system 104 can include simulators, such as computer based simulators used to simulate operation of a complex mechanical system.

The control system 108 receives user input signals 112 from a user 116, and additionally can provide feedback to the user 116 through one or more user feedback devices 120. The user input signals are received at user inputs 124 provided as part of the control system 108. In the example control system 108 of FIG. 1, 'n' user input devices 124a, 124b, and 124n are shown. As shown, any number of user input devices 124 can be included in a control system 108. In general, a user input device 124 converts or transforms a user input signal 112 into an electronic signal 128 that is provided to an adaptive control processing block or controller 132. The different user input devices 124 can each be responsive to different user input signals 112. Moreover, a single user input device 124 can be used to monitor and/or receive a plurality of user input signals 112. For example, as discussed in greater detail elsewhere herein, a user input device 124 can include a set of motion detection cameras that operates in association with tags or reflectors worn or placed on the body of the user 116, where detected motion within a first plane or degree of freedom comprises a first user input signal 112, and where detected motion within a second plane or degree of freedom comprises a second user input signal 112.

The controller 132 receives electronic signals 128 generated by the user input devices 124, and can transform the electronic signals 128 into corresponding control inputs 136 that are in turn provided to the controlled system 104. In accordance with embodiments of the present disclosure, and as discussed in greater detail elsewhere herein, the controller 132 can perform various filtering, proportioning, and other operations on the electronic signals 128 before providing corresponding control inputs 136 to the controlled system 104.

The user feedback device 120 can operate to provide the user 116 with information regarding the operation of the controlled system 104. For example, the current state of a directly or indirectly controlled parameter or mechanism of the controlled system 104, such as a steering angle, percentage of available throttle input, percentage of available braking input, relative location, absolute location, or other information can be presented through the user feedback device 120. In addition, where the controlled system 104 is a vehicle in which the user 116 is a passenger, and/or an apparatus or system that is observed by the user 116, feedback can be provided from the controlled system 104 to the user 116 directly, rather than or in addition to such feedback being provided through the user feedback device 120.

Figure 2:
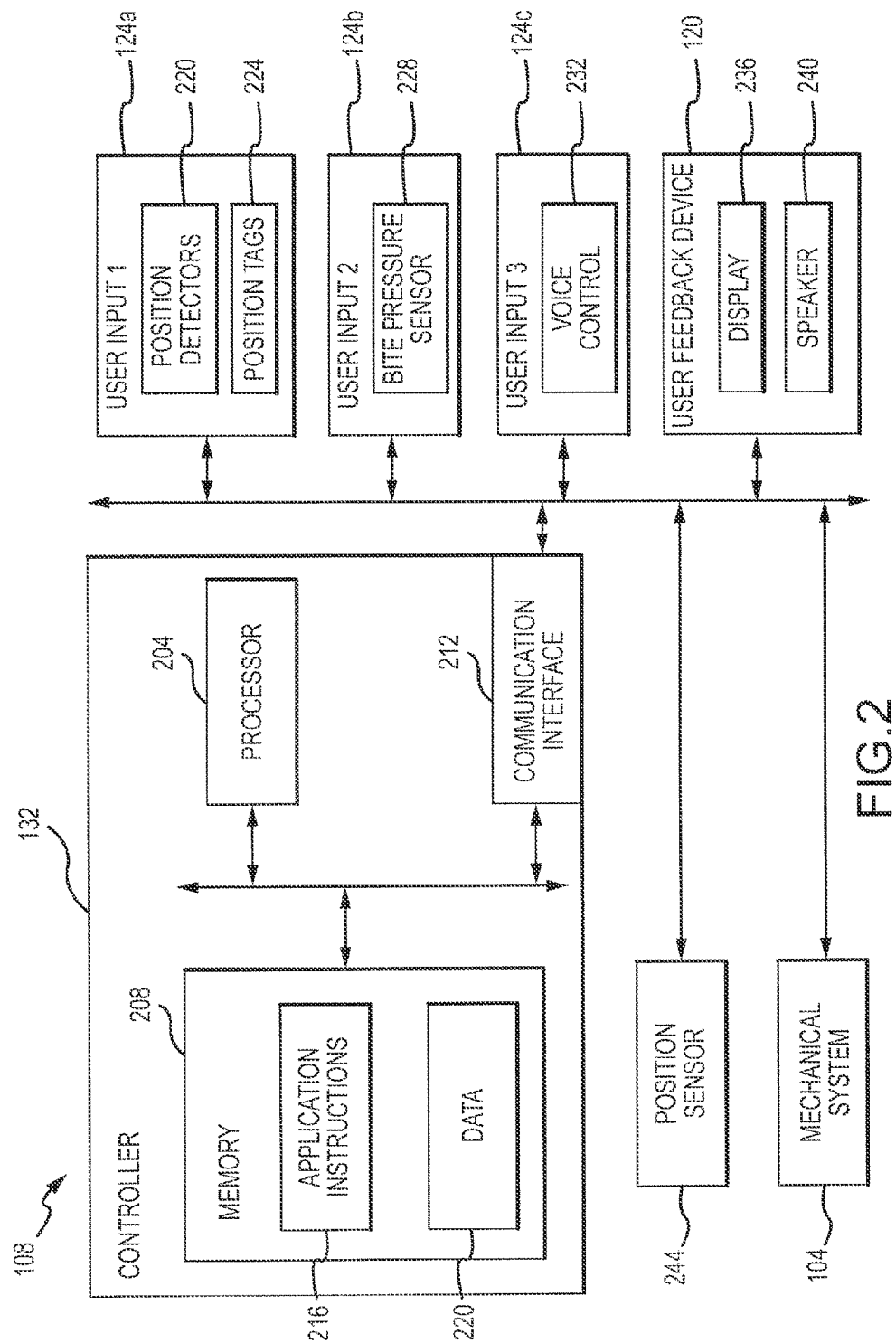
FIG. 2 depicts components of a control system in accordance with embodiments of the present disclosure.

With reference now to FIG. 2, components of a control system 108 in accordance with embodiments of the present disclosure are depicted. As shown, the controller 132 can include a variety of components, such as a processor 204, memory or data storage 208, and a communication interface 212. The processor 204 can include a general-purpose programmable processor or controller capable of executing instructions stored as software and/or firmware within the processor 204 itself or in associated memory 208.

The memory 208 can include solid-state memory devices, magnetic storage devices, optical storage devices and the like. Moreover, the memory 208 can incorporate more than one type of device. For example, certain instructions 216, such as application instructions or programming and data 220 may be stored in nonvolatile, solid-state memory, while other instructions 216 and data 220 may be stored in a hard disk drive. In general, the application instructions 216 can implement converters, filters, and other control algorithms applied to an electronic signal 128 received from the user input devices 124. Accordingly, as an example but without limitation, the application instructions 216 can implement one or more proportional-integral-derivative (PID) controllers. For instance, a different PID controller can be provided for each user input device 124. In addition, the application instructions 216 can implement logic used to prioritize between different user input signals 112. The memory 208 can also provide a store for data 220, such as system operating parameters, user profile information, controlled system 104 information, or any other data useful to the control system 108 or the user 116 in connection with operating the controlled system 104.

The communication interface 212 connects the controller 132 to other components, devices, or systems, and can therefore provide physical connections and associated software drivers to one or more networks, busses, point-to-point connections, or the like. Moreover, the connections can be wireline, and/or wireless connections. Although a single communication interface 212 is depicted in the figure, multiple communication interfaces 212 can be can be included as part of the control system 108, for example for exchanging signals with different user input devices 124 and/or control systems 104 over different communication channels. In accordance with still other embodiments, each individual communication interface 212 can support communications over a number of different shared and/or independent communication channels.

Different user input devices 124 can include different components. For example, a first user input device 124a can implement a motion controlled input. More particularly, the motion of a human extremity, such as the head, can be monitored by position detectors or cameras 220 having a field of view that encompasses a volume in which a plurality of position tags or reflectors 224 are located. Continuing the example of monitoring the motion of a user's 116 head, the position tags 224 can comprise hemispherical reflectors placed on a hat worn by the user 116. Another example of a user input device is the second user input device 124b, which can, for example, incorporate a bite pressure sensor 228. In such an embodiment, a user input 112 in the form of a force or amount of pressure applied by the user's 116 bite is received by the user input device 124b. A further example of a user input device is the third user input device 124c, which in this example includes a voice control unit 232. The voice control unit 232 can include a microphone, and associated speech recognition programming. The speech recognition programming can be incorporated into the voice control unit 232, can be provided as part of the application instructions 216 stored in memory 208 and executed by the processor 204 of the controller 132, or can be based in a computing cloud. Although three specific examples of user input devices 124 have been provided, it should be appreciated that embodiments of the present disclosure are not limited to any particular number or type of user input devices 124. In particular, a control system 108 can include one or more user input devices 124 of any type suitable for receiving a signal from a user 116.

The user feedback device 120 can include, for example, a display device 236 and/or a speaker 240. Other examples of user feedback devices 120 include devices that impart a vibration or other movement, such as tilting or rolling a platform supporting the user 116. The user feedback device 120 can depict a degree of control input currently being applied by the user 116 with respect to one or more controllable parameters, current operating parameters related to the controlled system 104, information related to a location of the controlled system 104, or any other information, including information relevant to the operation and/or control of the controlled system 104 and the control system 108. Accordingly, a user feedback device 120 can provide an output based on information provided by the controlled system 104, the control system 108, a position sensor 244 (e.g., a global positioning system receiver) associated with the controlled system 104, or from individual components of the controlled system 104 or the control system 108.

FIG. 3A depicts an example user input 124, such as user input 124a that monitors the motion of a human extremity, in accordance with embodiments of the present disclosure. The user input 124 includes a plurality of position detectors 220 that monitor a volume 304 in which a plurality of position tags 224 are located. The position detectors the 220 comprise camera units to 220a-d that each include a lens, solid-state image sensor, and illumination devices. For example, the solid-state image sensor of each camera units 220 can be a two-dimensional imaging array that is sensitive to infrared light of a certain wavelength or greater. The illumination devices can comprise light emitting diodes operable to output infrared light that can be detected by the solid-state image sensors. The position tags 224 can comprise retro-reflectors worn or placed on an extremity (e.g. a hand, arm, foot or head) of the user 116. In the illustrated example, the position tags 224 are mounted to a hat 308 worn on the head of the user 116. In a typical implementation, a plurality of position detectors 220 and a plurality of position tags 224 are provided. In particular, by monitoring the relative locations of position tags 224 within the fields of view of the position detectors 220, movement of the user's head can be detected and monitored. As an example, the tilt of the user's 116 head in forward and backward directions, within a first plane, can be monitored, as depicted in FIG. 3B, and can provide a first user input signal 112a1 to the user input device 124a. As another example, the roll of the user's 116 head in side to side directions, within a second plane that is set at some angle to the first plane, can be monitored, as depicted in FIG. 3C, and can provide a second user input signal 112a2 to the user input device 124a. Where the controlled system 104 comprises a vehicle, the bob (forward and backward tilt about the pivot of the neck, or a neck flexion along the dorsal-ventral plane) of the user's 116 head may comprise a first user input signal 112 that is provided to the controlled system 104 as an acceleration signal, while the lateral tilt (sideways tilt about the pivot of the neck) of the user's 116 head may comprise a second user input signal 112 that is provided to the controlled system as a steering signal.

Figure 4B:
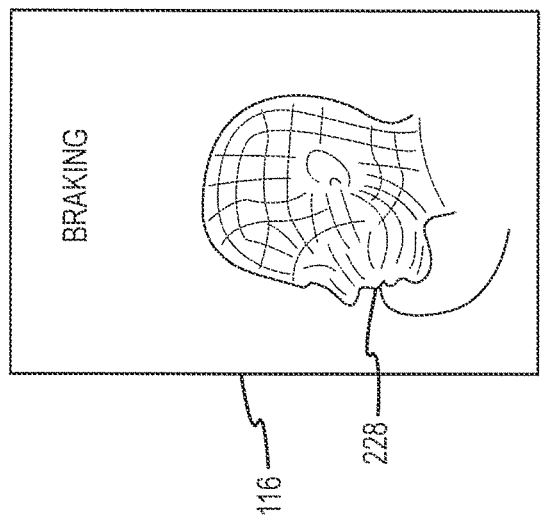
FIG. 4B depicts a user action monitored by the user input of FIG. 4A as a user input signal in accordance with embodiments of the present disclosure.
Figure 4A:
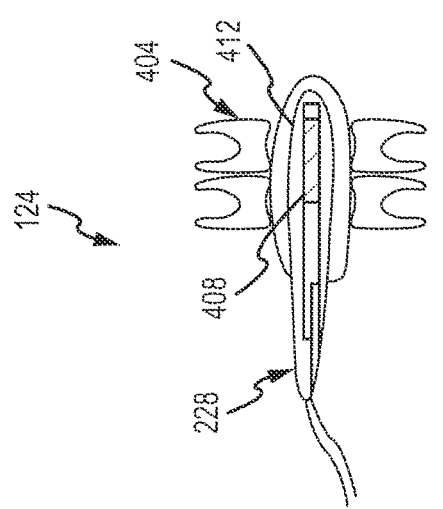
FIG. 4A depicts another example user input in accordance with embodiments of the present disclosure.

FIG. 4A depicts an example user input 124, such as a user input 124b, in accordance with embodiments of the present disclosure. The user input 124b includes a bite pressure sensor 228 that is held between the teeth 404 of the user 116, as depicted in FIG. 4B. The bite pressure sensor 228 can include a pressure transducer 408 encased within one or more layers of a plastic or other pliable, non-toxic material 412. By applying differing levels of force to the pressure transducer 408, the resistance presented by the pressure transducer 408 can be varied proportionally. The variable resistance signal is provided as an electronic signal 128 to the controller 132 of the control system 108, which can in turn derive an input signal 136 that is provided to the controlled system 104. Where the controlled system 104 comprises a vehicle, the bite pressure may comprise a user input signal 112 that is provided to the controlled system 104 as a braking signal.

Figure 5A:
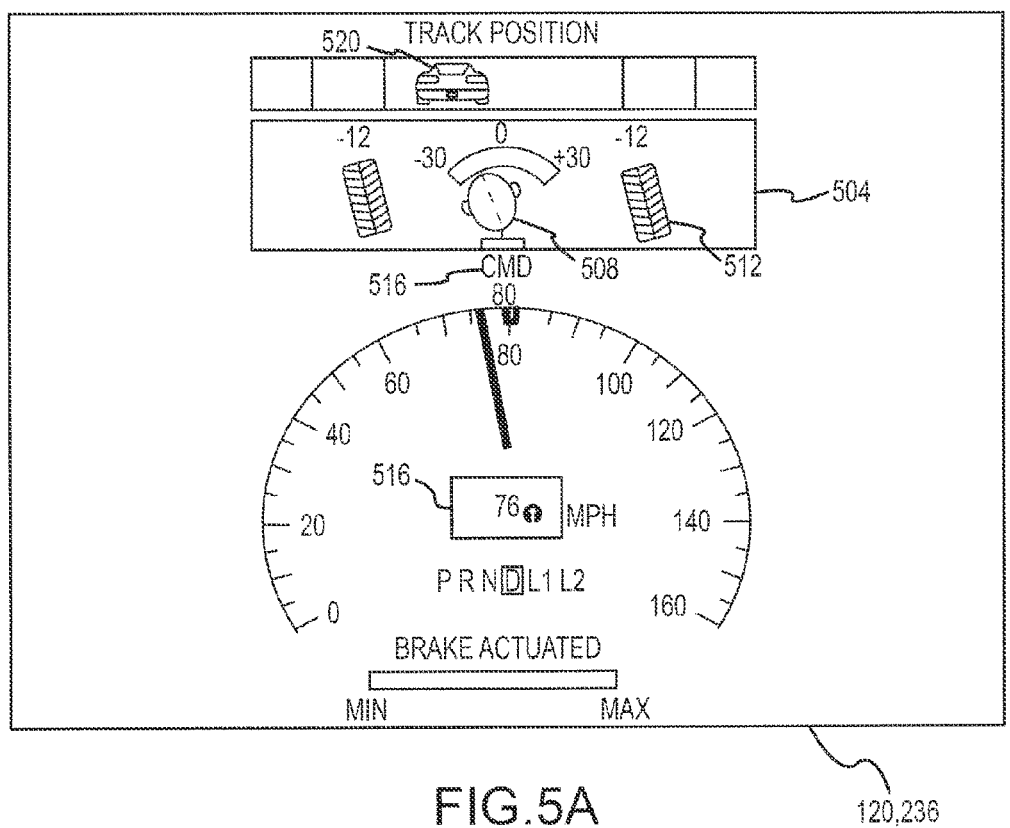
FIG. 5A depicts an example of a user feedback display in accordance with embodiments of the present disclosure.
Figure 5B:
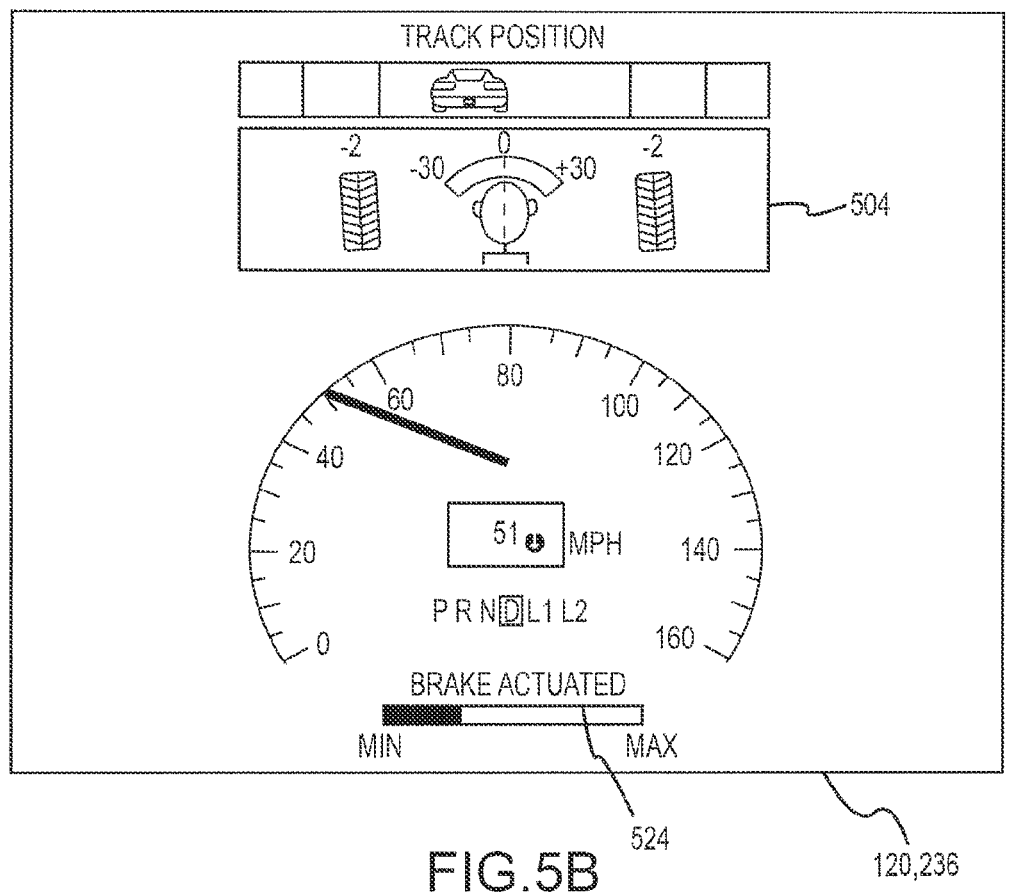
FIG. 5B depicts another example of a user feedback display in accordance with embodiments of the present disclosure.

FIGS. 5A and 5B depict examples of feedback that can be provided to the user 116 through a user feedback device 120 comprising a display. In FIG. 5A, a user input 112 in the form of a steering input is depicted in a steering feedback area 504 of the display. Specifically, a degree of held head tilt 508 (the motion depicted in FIG. 3C) detected by the control system 108, and a current amount of steering angle 512 is indicated by the user feedback device 120. The degree of head tilt can be used to determine a rate of change applied to the steering angle. In this example, because the user's head is tilted to the left, the steering angle will be increasing to the left. When the user's head returns to vertical, defined as the zero angle, the steering angle will remain at the angle last set by the user 116. A steering angle thus established can be "unwound" by tilting the head in the opposite direction, until the steering angle 512 is returned to zero. The display 236 also indicates the status of a throttle or acceleration user input 112, which in this example indicates a commanded speed of 80 mph as a highlighted speed 516 on a speedometer. Moreover, because the commanded speed 516 is depicted on a speedometer also showing a current speed, it can be seen that a signal to accelerate has been sent to the controlled system 108. A track position 520 of the vehicle relative to the edges of the track or road along which the vehicle is traveling is also displayed. The track portion 520 information can be obtained from a position sensor 244.

In FIG. 5B, the display 236 is shown while a user input 112 in the form of a braking signal is being applied. More particularly, an amount of brake actuation is displayed 524. Where a brake signal is indicated by the user 116 through the bite pressure sensor 228, the amount of brake actuation is proportional to the pressure applied by the user 116 to the bite pressure sensor 228. In accordance with at least some embodiments of the present disclosure, a brake signal results in any pending acceleration command being canceled. In addition, in this example display 236, a rate of change commanded by the steering input is set to zero, while the steering angle of the front tires is left at −2°. In accordance with embodiments of the present disclosure, a user input to apply the brakes and a user input to steer can be provided simultaneously, through two separate channels, and can result in the sending of simultaneous braking and steering control signals 136. However, in at least some embodiments, such as where one input device 124 is responsible for detecting steering and acceleration signals by detecting the tilt of user's head in two different planes, only one of the input signals (in this example, the steering input) will result in a corresponding control signal 136 that is sent to the controlled system 108.

Figure 6:
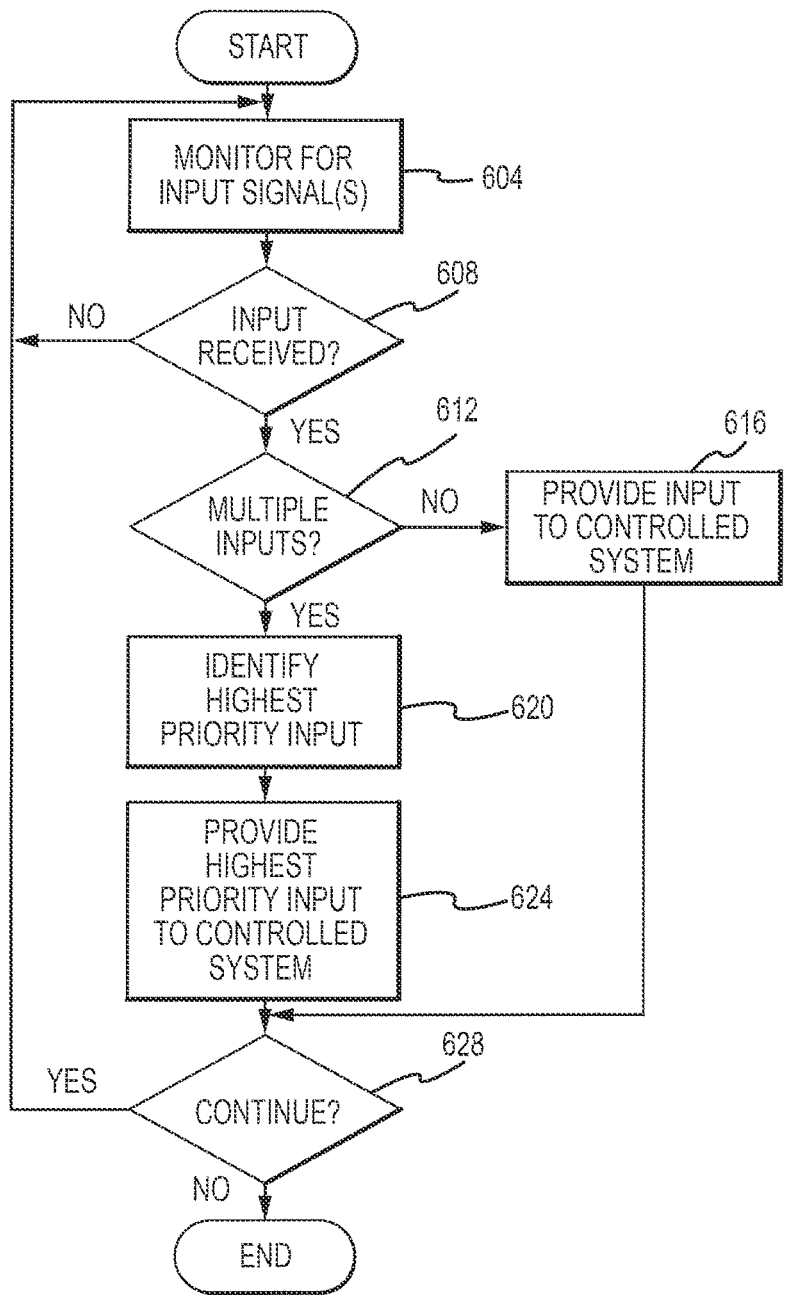
FIG. 6 depicts aspects of a method for providing a control system in accordance with embodiments of the present disclosure.

FIG. 6 is a flowchart depicting aspects of a method for providing control signals to a controlled system 104 in accordance with embodiments of the present disclosure. Initially, the control system 108 monitors the input devices 124 for a user input signal 112 (step 604). At step 608, a determination is made as to whether a user input signal 112 has been received. In particular, in accordance with embodiments of the present disclosure, an intentional user input signal 112 is distinguished from noise or unintentional user inputs. For example, where the user 116 is travelling in a vehicle, motion of the user's head due to external forces, such as bumps in the road and the like, need to be distinguished from intentional user input signals 112. The system 108 may continue to monitor signals from the input devices 124 until a user input signal 112 is detected.

If a user input signal 112 is detected, a determination can be made as to whether multiple user input signals 112 have been received (step 612). As an example, where one input device 124 is used to detect more than one user input signal 112, such as where movement of the user's head in one plane indicates a steering input signal and movement in another plane indicates an acceleration input signal, slight, coincidental movements in one of the planes that occur while a user intends to provide a control input in the other plane is desirably ignored. Accordingly, the controller 132 can perform filtering functions. If multiple user input signal 112 are not detected (i.e., a single user input signal 112 is detected), the control inputs 136 corresponding to the detected user input signal 112 is provided to the controlled system 104 (step 616).

In response to determining that multiple user input signals 112 have been received, the controller 132 can, by executing the application instructions 216 using the processor 204, determine the relative priorities of the detected user input signals 112, to identify the highest priority user input signal 112 (step 620). The control input 136 corresponding to the highest priority user input signal 112 can then be provided to the controlled system 104 (step 624). The lower priority user input signal or signals 112 can be ignored, at least until the higher priority user input signal 112 is no longer present.

In addition to providing control signals 136, the control system 108 can provide feedback to the user 116 through the user feedback device 120. Such feedback can be indicative of the control input 136 that to the control system 108 has derived from a detected user input 112. Accordingly, the feedback allows the user 116 to monitor the operation of the control system 108, and in particular the detection and interpretation of intentional and possibly unintentional user input signals 112, and the transformation of such user input signals 112 to control signals 136. In addition, the feedback can be indicative of a state of the controlled system 104.

At step 628, a determination can be made as to whether the operation of the control system 108 to provide control signals 136 to the controlled system 104, and to provide feedback to the user 116, should continue. If it is determined that operation should continue, the process returns to step 604. Alternatively, the process can terminate.

Figure 7:
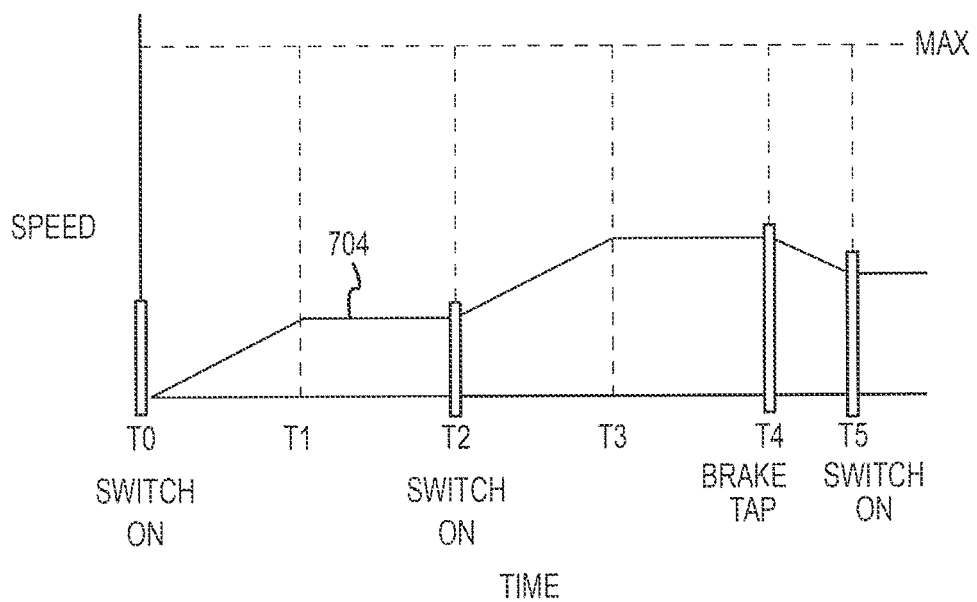
FIG. 7 depicts an example control sequence in accordance with embodiments of the present disclosure.

FIG. 7 depicts an example control sequence in accordance with embodiments of the present disclosure. More particularly, FIG. 7 illustrates a speed 704 of a vehicle comprising a controlled system 108 in response to a sequence of acceleration and brake commands provided as user input signals 112 to the control system 108. Initially, at time t0, a user input signal 112 in the form of an acceleration command is received. The acceleration command can be indicated through a bob of the user's head within a plane, for example as depicted FIG. 3B. Each bob of the user's head, or a continued bob/tilt of the user's head, can result in an increase in a commanded speed. Accordingly, the user input signal 112 to accelerate can operate like a conventional automobile cruise control system. At time $t_1$, the current speed 704 of the vehicle comprising the controlled system 104 has reached the commanded speed. After reaching the commanded speed, the vehicle continues at that speed. At time t2, a second user input signal 112 commanding an acceleration, is received. At time t3, the new speed is reached, and the vehicle continues at that commanded speed. At time t4, a user input signal 112 in the form of a brake signal is received. The receipt of the brake signal, as with a conventional automobile cruise control system, discontinues the application of any acceleration required to maintain the vehicle at the commanded speed. Moreover, the brake signal results in the application of the vehicles brakes for as long as the signal is sent. The force with which the brakes are applied can also be controlled by the user, and can be proportional to the amount of force applied to the bite sensor 408 (FIGS. 4A and 4B). Continuing the example, time t5, the application of the brakes is discontinued, and a signal setting a new commanded speed is received.

In an example embodiment, the present disclosure comprises a control system for a complex, mechanical system (such as a vehicle) that uses only input movements of the human head. Three control signals are available using this design:

One control signal is achievable as the human head is tipped left and right. This signal is demonstrated as a steering input to the vehicle.

A second control signal is achievable as the human head is bobbed backward and forward. This signal is demonstrated as an acceleration input to the vehicle.

A third control signal is achievable using the biting movement of the human jaw. This signal is demonstrated as a braking input to the vehicle These three control signals have the ability to control an automobile in operation.

In operation, each of the generated signals is provided as the input to an adaptive control processing element or controller 132. The controller, through execution of application programming 216 and or hardware filters, formats the signal, smooths and filters the signal as necessary, and provides the control signals 136 to actuators in the actual vehicle (simulator or automobile). The actuators can be, for example, motors that operate in response to the control signals 136, directly or after amplification or other signal conditioning. Status information from both the adaptive control processing element 104 and the simulator/automobile are provided to an operator display 236.

The operator display is necessary to ensure the operator or user 116 is aware of the type of signal he/she is submitting to the system. In traditional systems, steering wheel position and brake or accelerator pedal pressure provides feedback to the operator as to the magnitude of the input signal being provided. With no steering wheel or pedals, that feedback is not available. The operator display 236 is therefore used to provide this feedback to the operator.

In accordance with embodiments of the present disclosure, the operator's head position is determined precisely, and that data is used to control one or more aspects of a complex mechanical system. In particular, optical retro-reflectors are mounted on a ball cap, which is worn by the operator. Three or more infrared light emitters illuminate the retro-reflectors and the return energy is captured by infrared cameras. Using the various parallax values the system can precisely determine the position of each of the retro-reflectors.

Using the data captured from the cameras, the operator's head position can be captured in precise coordinates. By repeatedly capturing the operator's head position through time, the system can dynamically capture the operator's head motion. Using this technique, the operator's head tilt (left and right roll) can be used as a control input to provide driving signals to the complex mechanical system. The algorithms can be precisely tuned to the complex mechanical system being operated to ensure the signals are appropriately frequent to eliminate amplified feedback into the system being controlled, and filtered to ensure smooth control of the complex mechanical system.

The bite pressure sensor detects when, and by how much, the operator bites down on the sensor. This signal is then filtered, digitized, and sent to the complex mechanical system as a control system input.

When the operator is physically de-coupled from the system he/she is controlling, there is a need to ensure the operator is aware of both the signal being sent to the complex system and the response of the complex mechanical system to that input signal. The feedback that can be provided by embodiments of the present disclosure includes icons on the display to show the head tilt input (used for steering in this case), the current tire steering position, the speed, and the fact the brake control signal has been sent to the complex mechanical system.

Accordingly, embodiments of the present disclosure can be characterized by some or all of the following:
1. The ability to extract multiple control signals from a human head's position and relative velocity, in three dimensions (lateral tilt, forward/aft pitch (bob), and time)
2. The ability to extract control signals from bite pressure sensors.
3. The ability to filter the signals and use the signals to operate a complex mechanical system. For example:
   a. The ability to steer a vehicle using only one's head.
   b. The ability to accelerate a vehicle using only one's head.
   c. The ability to brake a vehicle using only one's head.
4. The ability to generate position/situational awareness and control signal input data and provide that data to the operator of the complex mechanical system.

Prior approaches using acoustics, radio-frequency energy, and muscle tension have not had sufficient speed or precision for an operator to control a complex machine with sufficient precision or speed. The approach of applying the appropriate algorithms to smooth and control data collected by precision data collection systems allows the operator to control a complex mechanical system at high speeds and with rapid control input. The feedback system provides the operator with timely, accurate feedback to ensure optimal control of the complex mechanical system.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for controlling a vehicle, comprising:
receiving a first user input signal through a first input mechanism of an input system, wherein the first input mechanism receives the first user input signal by detecting a first tilt of a head of a user in a first plane;
providing the first user input signal as a first control input to the vehicle, wherein the first control input changes a parameter of a first controlled mechanism of the vehicle, and wherein the first user input signal is a steering signal of a first magnitude and a first direction;
receiving a second user input signal through a second input mechanism of the input system, wherein the second input mechanism receives the second user input signal by detecting an amount of pressure applied by a bite of the user;
providing the second user input signal as a second control input to the vehicle, wherein the second control input changes a parameter of a second controlled mechanism of the vehicle;
receiving a third user input signal through the first input mechanism of the input system, wherein the first user input mechanism receives the third user input signal by detecting a second tilt of the head of the user in a second plane, and wherein at least a portion of the first user input signal and at least a portion of the third user input signal are received simultaneously;
determining by a controller a relative priority between the first user input signal and the third user input signal, wherein as a result of the determination of the relative priority between the first user input signal and the third user input signal the first user input signal is provided as the first control input to the vehicle and the third user input signal is not provided as a control input to the vehicle;
displaying an indication of the magnitude and the direction of the first user input signal through a display device located in the vehicle; and
displaying an indication of a magnitude and a direction of the first controlled mechanism to the user through the display device or another display device located in the vehicle, wherein during at least a first time period the at least one of the magnitude and the direction of the first user input signal is different than the at least one of the magnitude and the direction of the first controlled mechanism,
wherein in response to a first instance of the first user input signal the indication of the magnitude and direction of the first user input signal shows the first magnitude and the first direction, wherein in response to providing the first instance of the first user input signal as a first instance of the first control input to the first controlled mechanism a steering angle of front tires of the vehicle is changed in the first direction, wherein in response to providing the first instance of the first control input to the first controlled mechanism the indication of the magnitude and direction of the first controlled mechanism shows the front tires turned in the first direction by a non-zero amount,
wherein in response to a second instance of the first user input signal the indication of the magnitude and direction of the first user input signal shows a second magnitude and a second direction, wherein in response to providing the second instance of the first user input signal as a second instance of the first control input to the first controlled mechanism a steering angle of the front tires is changed in the second direction, wherein in response to providing the second instance of the first control input to the first controlled mechanism the indication of the magnitude and direction of the first controlled mechanism shows the front tires at a zero steering angle.

2. The method of claim 1, wherein the first input mechanism communicates with the input system over a first communication channel, and wherein the second input mechanism communicates with the input system over a second communication channel.

3. The method of claim 2, wherein at least a portion of the first user input signal and at least a portion of the second user input signal are received simultaneously.

4. The method of claim 3, wherein at least a portion of the first control input and at least a portion of the second control input are provided to the vehicle simultaneously.

5. The method of claim 2, wherein the first user input signal is received at a first time and is provided as the first control input to the vehicle, and wherein the third user input signal is received at a second time and is provided as a third control input to the vehicle.

6. The method of claim 5, wherein the first control input is a steering command, wherein the second control input is a braking command, and wherein the third control input is an acceleration command.

7. The method of claim 1, wherein the at least a portion of the first user input signal, the at least a portion of the third user input signal, and at least a portion of the second user input signal are received simultaneously, wherein the first user input signal is provided as the first control input to the vehicle, wherein the third user input is not provided as a control input to the vehicle, and wherein the second user input is provided as the second control input to the vehicle.

8. The method of claim 7, further comprising:
in response to receiving the first and second user input signals, determining a relative priority of the first and second user input signals.

9. The method of claim 7, further comprising:
after the first user input signal is no longer received and in response to continuing to receive the third user input signal, providing the third user input signal as a third control input to the vehicle.

10. A control system, comprising:
a first user input;
a first communication channel, wherein the first user input is connected to the first communication channel;
a second user input;
a second communication channel, wherein the second user input is connected to the second communication channel;
a control unit, including:
 a communication interface, wherein the communication interface of the control unit is connected to the first user input by the first communication channel, and wherein the communication interface of the control unit is connected to the second user input by the second communication channel;
 memory, wherein the memory includes application instructions operable to implement an algorithm to process signals received from the first and second user inputs and to convert the signals received at the control unit to control signals for a first mechanical system;
 a processor, wherein the processor is operable to execute the application instructions stored in the memory, wherein the first user input detects a first tilt of a head of a user in a first plane as a first user input signal, wherein in response to receiving the first user input signal through the first user input the processor executes the application instructions and provides a first control signal to the first mechanical system through the communication interface, wherein the second user input detects an amount of pressure applied by a bite of the user as a second user input signal, wherein in response to receiving the second user input signal through the second user input the processor executes the application instructions and provides a second control signal to the first mechanical system, wherein the first mechanical system is a vehicle, wherein the first user input signal is a steering input, and wherein the second user input signal is a braking signal;
a user output, wherein indications of the first and second control signals that are output by the control unit to the first mechanical system in response to the first and second user input signals are provided by the control unit to the user output,
wherein the indications of the first and second control signals are output by the user output,
wherein an indication of a current steering angle is output by the user output,
wherein the first user input detects a second tilt of the head of the user in a second plane as a third user input signal,
wherein in response to receiving the third user input signal through the first user input the processor executes the application instructions and selectively provides a third control signal to the first mechanical system,
wherein the processor is operable to determine a priority between the first user input signal received through the first user input and the third user input signal received through the first user input based on a priority of the first user input signal relative to a priority of the third user input signal,
wherein the first user input signal has a higher relative priority than the third user input signal, and
wherein while the first user input is present the first control signal is provided to the first mechanical system and the third control signal is not provided to the first mechanical system.

11. The control system of claim 10, wherein the third control signal is provided to the first mechanical system while the third user input signal is present after the first user input signal has been discontinued.

12. The control system of claim 10, wherein in response to receiving the second user input signal and one of the first and third user input signals simultaneously, the second control signal and a corresponding one of the first and the third control signals are provided to the first mechanical system simultaneously.

13. A vehicle control system, comprising:
a first user input device, wherein the first user input device includes a plurality of position sensors and a plurality of reflectors, wherein the position sensors in the plurality of position sensors are operable to sense a position of the reflectors in the plurality of sensors within at least a first volume, wherein a position of the reflectors in a first plane within the first volume provides a first user input signal, wherein a position of the reflectors in a second plane within the first volume provides a third user input signal, wherein the first user input device is operable to determine a tilt of the reflectors within the first plane at a plurality of points in time as the first user input signal, wherein the first user input device is operable to determine a tilt of the reflectors within the second plane at a plurality of points in time as the third user input signal, and wherein the reflectors are placed on a head of a user;
a second user input device, wherein the second user input device includes a pressure sensor, and wherein the second user input device is operable to determine an amount of pressure applied by a bite of the user as a second user input signal;
a control unit, the control unit including:

a communication interface, wherein the control unit is connected to the first user input device by a first communication channel and by the communication interface, and wherein the control unit is connected to the second user input device by a second communication channel and by the communication interface;

memory, wherein the memory includes application instructions operable to convert signals received at the control unit from at least the first and second user input devices to control signals for a first mechanical system;

a processor, wherein the processor is operable to execute the application instructions stored in the memory, wherein in response to receiving the first user input signal through the first user input device the processor executes the application instructions and provides a first control signal to the first mechanical system through the communication interface, wherein in response to receiving the second user input signal through the second user input device the processor executes the application instructions and provides a second control signal to the first mechanical system, wherein the processor is operable to determine a priority between the first user input signal received through the first user input and the third user input signal received through the first user input based on a priority of the first user input signal relative to a priority of the third user input signal, wherein the first user input signal has a higher relative priority than the third user input signal, and wherein while the first user input is present the first control signal is provided to the first mechanical system and a third control signal is not provided to the first mechanical system; and a display device, wherein the first control signal is a steering control signal, wherein the second control signal is a braking control signal, wherein the third control signal is an acceleration control signal, wherein an indication of a magnitude and a direction of the first control signal is provided by the control unit to the display device and is output by the display device to the user, and wherein an indication of at least a magnitude of the second control signal is provided by the control unit to the display device and is output by the display device to the user.

14. The vehicle control system of claim 13, wherein an indication of at least a magnitude and a direction of a first controlled mechanism of the first mechanical system is output by the display device, and wherein the indication of the magnitude and the direction of the first controlled mechanism is different than the indication of the magnitude and the direction of the first control signal.

15. The control system of claim 10, wherein the indication of the first control signal that is output by the user output is different than the indication of a current steering angle that is output by the user output.

* * * * *